United States Patent Office 3,301,070
Patented Jan. 31, 1967

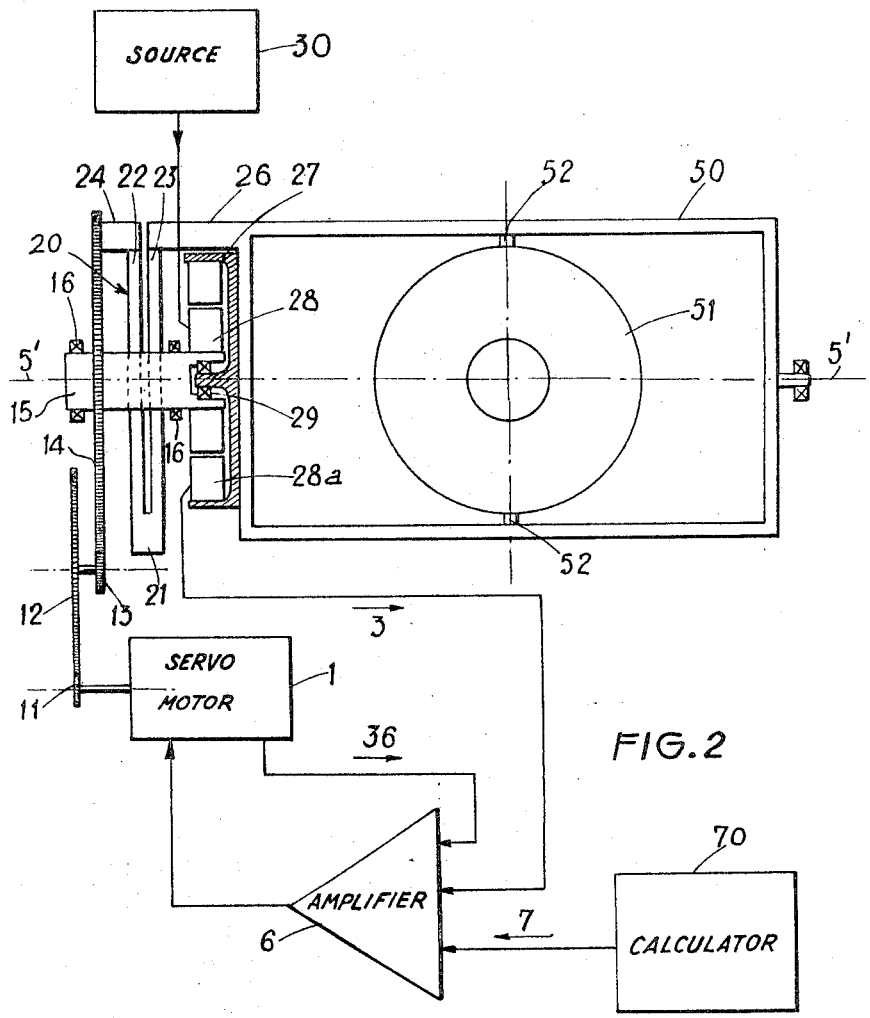
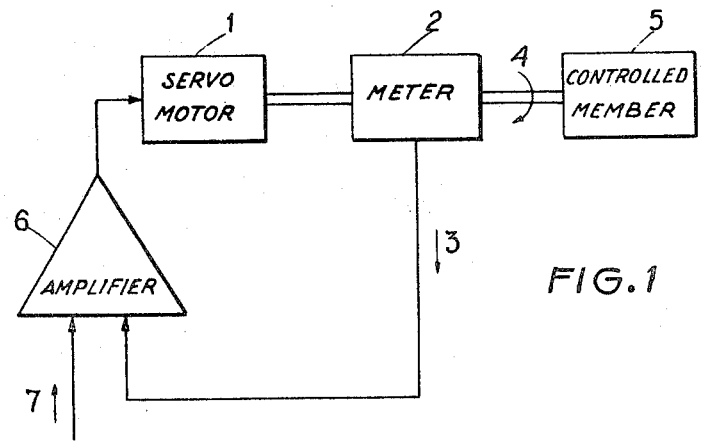

1

3,301,070
GYROSCOPE PRECESSION CONTROL SYSTEM
Marcel Lapierre, Paris, France, assignor to CSF—Compagnie Generale de Telegraphie Sans Fil, a corporation of France
Filed May 20, 1964, Ser. No. 368,920
Claims priority, application France, May 28, 1963, 936,207
6 Claims. (Cl. 74—5.4)

The present invention relates to arrangements for applying a given torque to a member and more particularly to systems for controlling the precession of a gyroscope.

To this effect a torque motor is generally used which motor develops a torque as a function of the electric signals applied thereto. In many applications, the space available for such a motor is small so that the torque which can be made available is very low.

Reduction gears can appreciably increase this torque but bring about undesired friction.

On the other hand, it may be difficult in particular in motors with a relatively high output torque, to insure a well defined relationship between the control signal and the torque.

It is an object of the invention to avoid all those drawbacks by providing a system for controlling a gyroscope, which is small, does not react at acceleration, and provides a torque proportional to the control signal.

To this end the invention provides a system for controlling the precession of a gyroscope, comprising a spring which can be deformed through rotation and is associated with a meter arrangement, for example of the induction type. A feedback loop is provided for comparing the torque which it is desired to apply to the gyroscope and the torque actually applied to the latter and thus controlling the motor.

The deformable spring is preferably U shaped, its extremities being fixed respectively to the member developing the torque and to the member to which the torque is applied. The legs of the U shaped spring are corrugated. Preferably they comprise an integer number of undulations and are terminated at the peak of an undulation.

The invention will be better understood from the following description and appended drawing, wherein:

FIG. 1 shows, very diagrammatically, the operating principle of a torque providing system according to the invention;

FIG. 2 shows an arrangement according to the invention including a torque measuring device incorporating a spring deformable through rotation and associated with a transmitter;

Figure 3:
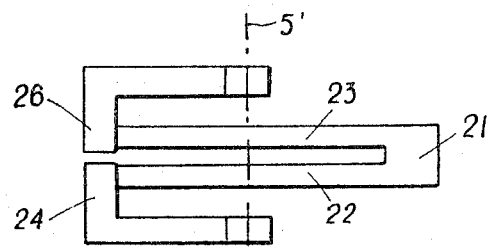
FIG. 3 is a front view of a straight U shaped spring unstressed.

Referring to FIG. 1, the torque developed by a servo motor 1 is delivered, for example through a speed reducing gear, to a torque measuring device 2 connected to a controlled member 5.

Measuring device 2 has an output signal 3 which is a function of the torque 4 applied to member 5.

Signal 3 is opposed at the input of an amplifier 6 to the input signal 7 which at every instant defines the torque which is to be applied to the controlled member 5. The

2 connections are such that amplifier 6 will act on servo motor 1 so as to reduce the difference between the two signals, the applied torque 4 becoming thus equal to the torque defined by signal 7 and the approximation increasing with the gain of amplifier 6.

FIG. 2 shows a gyroscope whose precession in azimuth is controlled by the servo system according to the invention which has just been described.

Servo 1 acts on a U shaped spring 20, having a base 21 and legs 22 and 23, perpendicular to base 21.

The free end of legs 22 is fixed to a member 24 to which the torque is applied by servo motor 1 through gears 11 to 14 of a speed reducer.

The free end of leg 23 is rigidly connected to a member 26 which is in turn rigidly connected to an outer gimbal 50, within which an inner gimbal 51 is mounted to swing on pivots 52, said inner gimbal forming an envelope within which the gyroscope rotates.

The output gear 14 of the servo motor speed reducer drives a shaft 15, set on bearings 16. In shaft 15, a mortise is cut so as to leave free space for spring 20 to be freely deformed.

A synchro transmitter 27', has its rotor 28 mounted on shaft 15 and a stator 28a rigidly connected to gimbal 50.

Gimbal 50 and stator 28a are supported on a ball bearing 29 coaxial with shaft 15 and inserted in a recess cut in said shaft.

Rotor 28 receives a reference A.-C. voltage from a source 30. As is well known in the art, voltage 3 collected at the output of the winding of stator 28a is proportional to the reference voltage and to the sine of the angle through which the rotor 28 has rotated with respect to the stator 28a, i.e. practically to the deformation angle of spring 20 when this angle is small.

Voltage 3 is fed to the input of amplifier 6, so as to oppose the control signal 7 provided, for example, by a computer 70.

The control loop 1–11–12–13–14–24–20–26–27–6 is properly damped in accordance with conventional techniques, for example by means of a tachometric generator (not shown) associated with servo motor 1 and whose output voltage 36 is fed back to the input of amplifier 6.

The operation of the system is as follows:

Motor 1 develops a torque which deforms the spring by an angle $\theta$. As will be shown, according to the invention, this angle $\theta$ is proportional to the torque developed by the servo motor. A measure of this angle is provided by transmitter 27 as a voltage 3 which is practically proportional to $\theta$, i.e. is very nearly proportional to the torque.

Since voltage 3 is fed to amplifier 6, in such a way that it opposes signal 7, motor 1 will rotate until opposite voltages 3 and 7 equal to each other, which corresponds to a value of $\theta$ proportional to voltage 7.

It is known that the angular velocity of the precession in azimuth $\Omega$ is proportional to torque 4 applied to gimbal 50 according to the equality:

$$C = \Omega I \omega$$

where C is the value of torque 4 and $I\omega$ the moment of momentum of a gyro whose moment of inertia with respect to its rotation axis is I, the gyro rotating about this axis at a constant speed which is much greater than $\Omega$.

If the system is correctly adjusted, the precession speed $\Omega$, which is proportional to torque C, i.e. to the servo motor torque will be proportional to control signal 7.

Of course, for this to be true, it is necessary that torque 4 applied to the gyro should be a function of the spring deformation only, to the exclusion of any parasitic effects which might arise, for example from a lack of alignment of the axis of shaft 15 and of the axis of gimbal 50, or an excess of friction.

The arrangement of the invention, in which the same bearing 29 insures the centering of the transmitter and supports gimbal 50, reduces parasitic effects to a minimum.

Figure 7:
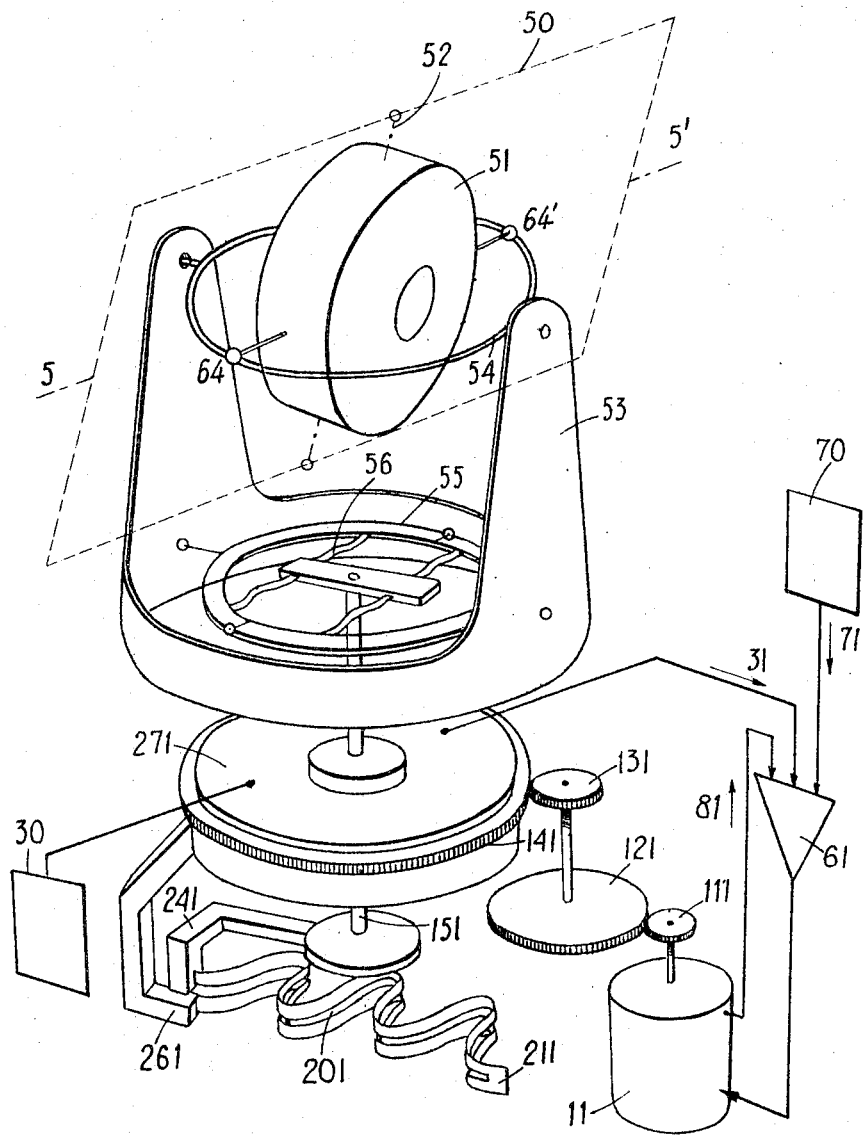
FIG. 7 shows the arrangement for controlling the precession in elevation of a gyroscope which can be independently controlled in azimuth through the arrangement of FIG. 2.

By way of example, FIG. 7 shows a servo system for the precession in elevation, which is intended for being passociated with the precession control in azimuth illustrated in FIG. 2.

The elements common to the arrangement shown in FIG. 2 and FIG. 7 have been designated by the same reference numbers. Those which are similar, but are duplicated, have been designated by the same reference numbers to which digit 1 has been added at the right. Thus, for example, to motor 1 of FIG. 3 corresponds motor 11 of FIG. 7 and to spring 20 of FIG. 3 corresponds a spring 201 in FIG. 7.

The torque is transmitted to gimbal 51 by means of a fork shaped member 53 in which a gimbal 54 is mounted. The inner gimbal 51 is journalled in gimbal 54 at 64 and 64'. Fork 53 is submitted to the action of a torque transmitted by shaft 151 through a gimbal 55 and an elastic member 56 which allows for any deviation in the vertical direction.

The spring used according to the invention will now be described in detail, this spring being in particular characterized by its ability to provide large torques with relatively important deformation.

Figure 4:
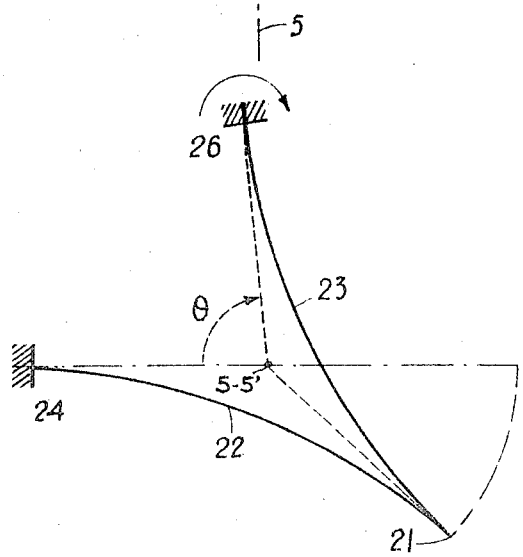
FIG. 4 is a schematic top view of the spring of FIG. 3 as deformed.

FIG. 4 shows schematically a top view of the legs 22 and 23 of the straight spring, shown in front view in FIG. 3, as deformed under the action of a torque applied to end 26, the other end 24 being assumed to remain stationary. The legs, which were straight at the start, lie along arcs of circles.

Computations shows that the motion of the free end of the spring under the action of a torque, is very nearly a rotation about a point which is very close to the initial position of the leg midpoints.

Conversely, if the free end is made to rotate about this center, the legs will be deformed substantially along arcs of circle, which has the consequence that the bending moment varies only very little along the legs. Under such conditions, the spring can have a high angular deformation for a given stress and the deformation angle $\theta$ is very nearly proportional to the applied couple.

Appreciable deformation can be obtained, for example a deformation by 60°, on both sides of the rest position. These deformations being nearly proportional to the applied torque, provided the transmitter is linear, an accurate measurement of the torque and thereby a precise control of the precession speed by the control signal in the above illustrated example, is thus obtained.

The spring used according to the invention, has other attractive features. Being comparatively short for a given capacity, the risk that it may sag under the action of gravity or shakes is avoided for all practical purposes. Furthermore computations show that the spring center of gravity will undergo little displacement upon deformation.

However, a flat U shaped spring, cut from a metal sheet, for example, as illustrated in FIG. 3, would offer too much longitudinal rigidity in its unstressed position. In mechanisms where there is little play, the slightest departure from the theoretical position, due, for example, to mechanical tolerances, aging or expansions, would result in a heavy load on bearings, generating heavy friction torques, or spring buckling, causing instability around the null position and affecting angle-torque linearity.

These drawbacks have been obviated by corrugating the spring so as to provide adequate longitudinal compliance.

Figure 6:
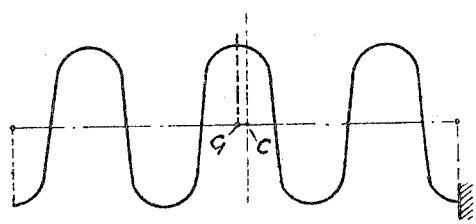
FIG. 6 is a profile view of one leg of the spring of FIG. 5.
Figure 5:
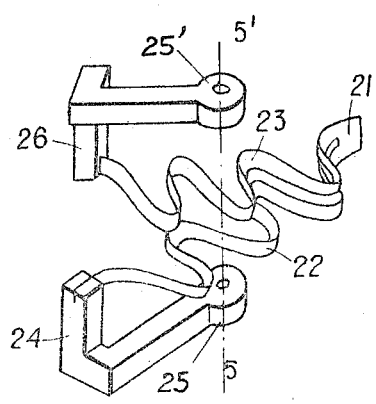
FIG. 5 is a perspective view of a corrugated spring according to the invention.

FIGS. 5 and 6 illustrate such a spring respectively in perspective and in top view in unstressed position.

Computations and experience show that the corrugated spring deforms in the same manner as a straight spring under the action of the applied torque.

Longitudinal compliance being proportional to the undulation depth whatever the number of corrugations, this depth will be chosen in acordance with the aceptable load on the bearings and the expected deviation.

To avoid lateral displacement of the spring under accidental traction or compression in the direction of the U legs, the spring will have to be affixed at the peak of a wave, and not on the wave axis, and end 21 common to both legs will also have to be a peak of a wave located on the same side as the fixture point with respect to the center line.

To obtain a still more constant bending along the corrugated spring leg, it is advantageous to mount the spring so that the center of gravity of its active line, i.e. waves midpoint, should be slightly offset with respect to the rotation center C, as can been seen in FIG. 6.

The spring being corrugated, its spread out length will be apreciably increased; it will be, for example, equal to five times the actual longitudinal dimensions of the spring and this is this length that actually limits the practical spring deformation angle. The thickness of the spring blade can be increased proportionally to its length thereby increasing the elastic energy (proportional to the third power of its thickness), which can be stored in the spring.

By way of example, the following spring characteristics have been determined to be well suited for gyroscope precession control acording to the invention:

Maximum torque _____ 0.05 Newton motor.
Deformation angle _____ $\theta$ max 60°.

Spring blade dimensions (see FIG. 6):

Corrugation wave length _____ 16 mm.
Peak to peak distance _____ 14 mm.
Number of corrugations per leg _ 3.
Longitudinal dimensions _____ 42 mm.
Spread out length _____ 213 mm.
CG shift _____ 0.4 mm.
Cross section _____ 4 x 0.66 mm. or 3.2 x 0.7 mm.

The slight shift CG insures a constant bending moment around maximum $\theta$.

For a 0.7 mm. thickness, the stress for the maximum deformation is when the spring is suitably fitted, 270 MPa.

The invention thus makes it possible to substitute for the torque providing motor a servomechanism of reduced power and dimensions, capable of developing high torques, which are substantially proportional to the control signal.

The invention is not limited to the particular spring described, associated with the above described transmitter, which is particularly suitable for gyro precession control onboard aircrafts where abrupt accelerations can occur, and generally speaking the invention is not limited to the embodiments described and shown which were given solely by way of example.

For example, a torsion rod or a strain gauge may be substituted for the spring.

What is claimed is:

1. A gyroscope system comprising: a gyroscope; an outer and an inner gimbal within which said gyroscope is mounted; at least one servomotor, having a control input; means for controlling said servomotor for providing a torque; a speed reducer associated with said servomotor and having an output shaft; a spring having two corrugated legs having respective first and second ends, said first ends being connected to each other and said second ends being respectively connected to said reducer and to one of said gimbals for passing said torque thereto; metering means, comprising a transmitter stator associated with said reducer and a transmitter rotor associated with said gimbal for measuring said torque; and comparing means having two inputs respectively coupled to said control means and to said rotor, and an output coupled to said servomotor control input.

2. A gyroscope system comprising: a gyroscope; an outer and an inner gimbal within which said gyroscope is mounted; at least one servomotor having a control input; control means for controlling said motor for providing a torque; a fork shaped member for applying said torque to one of said gimbals, said fork having a base associated with said motor and two prongs connected to said gimbal; means for measuring said torque; comparing means having two inputs, respectively coupled to said control means and to said measuring means, an output, coupled to said servomotor control input and an additional gimbal for connecting said prongs with said first mentioned gimbal.

3. A gyroscope system comprising: a gyroscope; an outer and an inner gimbal within which said gyroscope is mounted; at least one servomotor having a control input; control means for controlling said motor for providing a torque; a fork shaped member for applying said torque to one of said gimbals, said fork having a base flexibly associated with said motor and two prongs connected to said gimbal; metering means comprising a transmitter rotor associated with said motor and a transmitter stator associated with said gimbal for measuring said torque; and comparing means having two inputs, respectively coupled to said control means and to said metering means, and an output, coupled to said servomotor control input.

4. A gyroscope system comprising: a gyroscope; an outer and an inner gimbal within which said gyroscope is mounted; at least one servomotor having a control input; control means for controlling said motor for providing a torque means for measuring said torque; a fork shaped member for applying said torque to one of said gimbals, said fork having a base and two prongs connected to said gimbal; a speed reducer associated with said motor and having an output shaft; a spring having two corrugated legs having respective first and second ends, said first ends being connected to each other and said second ends being respectively connected to said reducer and to said base for passing said torque thereto and comparing means having two inputs, respectively coupled to said control means and to said measuring means, and an output coupled to said servomotor control input.

5. A gyroscope system comprising: a gyroscope, a first outer and an inner gimbal within which said gyroscope is mounted; a third gimbal means for journalling said first inner gimbal in said third gimbal; a first servomotor having a first control input; control means for controlling said first motor for providing a torque; a fork shaped member for applying said torque to said third gimbal, said fork having a base connected to said first motor and two prongs connected to said third gimbal; first metering means for measuring said torque; first comparing means having two inputs respectively coupled to said first control means and to said first metering means, and an output coupled to said first motor control input; a second servomotor having a second control input; further control means for controlling said second motor for providing a further torque; flexible means for applying said further torque to said first outer gimbal, means for measuring said further torque; and second comparing means having two inputs respectively coupled to said further control means and to said second metering means, and an output coupled to said second control input.

6. A spring for applying to a member a torque proportional to a rotation angle of a motor, said spring having two flexible legs corrugated to form waves, said legs having respective first ends directly connected to each other to form a U shaped structure and second ends respectively connected to said motor and to said member.

References Cited by the Examiner
UNITED STATES PATENTS 2,606,447  2/1952  Boltinghouse _____ 74—5
3,068,705  12/1962  Tilly et al. _____ 74—5.4

FRED C. MATTERN, JR., *Primary Examiner.*

BROUGHTON G. DURHAM, *Examiner.*

T. W. SHEAR, *Assistant Examiner.*